United States Patent
Federighi et al.

(10) Patent No.: US 8,645,225 B1
(45) Date of Patent: *Feb. 4, 2014

(54) ORGANIC SUPPLIER ENABLEMENT BASED ON A BUSINESS TRANSACTION

(75) Inventors: Craig Michael Federighi, Los Altos Hills, CA (US); Steven Carlyle Ihde, San Francisco, CA (US); Sanish Mondkar, San Jose, CA (US); Mohak Shroff, Fremont, CA (US)

(73) Assignee: Ariba, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/461,522

(22) Filed: May 1, 2012

Related U.S. Application Data

(63) Continuation of application No. 11/517,944, filed on Sep. 8, 2006, now Pat. No. 8,190,482.

(51) Int. Cl.
*G06Q 30/00* (2012.01)
(52) U.S. Cl.
USPC ............... 705/26.1; 705/26.35; 705/26.41
(58) Field of Classification Search
USPC ............................................. 705/26.1–27.2
See application file for complete search history.

(56) References Cited

U.S. PATENT DOCUMENTS

| | | | |
|---|---|---|---|
| 6,219,653 B1* | 4/2001 | O'Neill et al. | 705/400 |
| 2002/0038292 A1* | 3/2002 | Quelene | 705/80 |
| 2002/0103746 A1* | 8/2002 | Moffett, Jr. | 705/37 |
| 2004/0034583 A1* | 2/2004 | Lanier et al. | 705/35 |
| 2006/0085276 A1* | 4/2006 | Hoech et al. | 705/26 |
| 2007/0185775 A1* | 8/2007 | Lawton | 705/26 |
| 2008/0027875 A1* | 1/2008 | Adkins et al. | 705/76 |
| 2012/0296780 A1* | 11/2012 | McEntire | 705/27.2 |

OTHER PUBLICATIONS

Agresso/Alito partnership provides end-to-end e-procurement capability. M2 Presswire, p NA Apr. 14, 2005.*

* cited by examiner

*Primary Examiner* — William Allen
(74) *Attorney, Agent, or Firm* — Van Pelt, Yi & James LLP

(57) ABSTRACT

Enabling a supplier is disclosed. An indication of a transaction associated with a business process between a buyer and a supplier is received. A supplier enablement action is initiated in response to receiving the indication. The supplier enablement action is associated with enabling the supplier to join a supplier network.

16 Claims, 9 Drawing Sheets

ORGANIC SUPPLIER ENABLEMENT BASED ON A BUSINESS TRANSACTION

CROSS REFERENCE TO OTHER APPLICATIONS

This application is a continuation of co-pending U.S. patent application Ser. No. 11/517,944 entitled ORGANIC SUPPLIER ENABLEMENT BASED ON A BUSINESS TRANSACTION filed Sep. 8, 2006 which is incorporated herein by reference for all purposes.

BACKGROUND OF THE INVENTION

Some supplier networks include a transaction routing hub that connects one or more suppliers and one or more buyers. As an example of how a supplier network is used, in some cases a given buyer enters or provides purchase information electronically and the purchase information is routed or otherwise sent to a given supplier. This may, for example, enable a buyer to make purchases in a completely paperless manner. Getting suppliers to join a supply network (i.e., supplier enablement) is a necessary task but is often very time consuming. Improved techniques for supplier enablement would be desirable.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
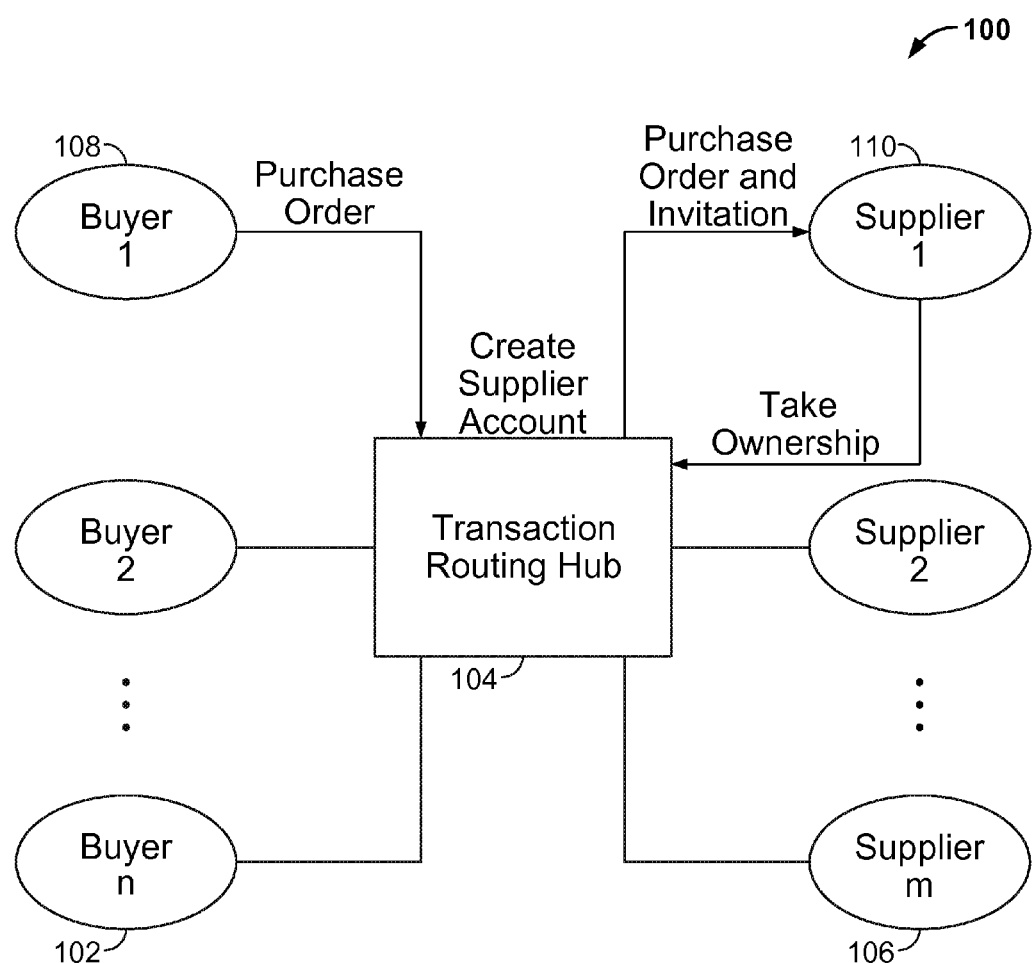
FIG. 1 is a system diagram illustrating an embodiment of a supplier network in which a supplier is organically enabled based on a purchase order.

FIG. 1 is a system diagram illustrating an embodiment of a supplier network in which a supplier is organically enabled based on a purchase order. In the example shown, multiple buyers and multiple suppliers are associated with supplier network 100. A given buyer purchases goods or services from one or more suppliers that are associated with supplier network 100 and a given supplier supplies one or more buyers. In some embodiments, a transaction routing hub that is included in supplier network 100 aggregates transactions or traffic between buyers and/or supplier; a given buyer/supplier may not necessarily be aware of other suppliers/buyers (e.g., that they do not interact with). In some embodiments, business transaction information or other confidential or proprietary information is kept in confidence. For example, the terms of a purchase between a particular buyer and supplier may be kept confidential from other buyers/suppliers not involved in the purchase.

In some embodiments, a supplier network is architected or organized in some other manner than the examples described herein. For example, in some embodiments, a single buyer hosts a private portal and enables its suppliers to this portal only. For example, some supplier networks are associated with a single buyer and each buyer has its own private portals.

In various embodiments, transaction routing hub 104 has a variety of operations, features, and/or functions associated with it. In this example, transaction routing hub 104 routes a purchase order from a buyer to a supplier, for example using electronic or digital storage or communication techniques. As such, information such as channel, mapping and/or routing information used to properly handle and forward a purchase order is stored and maintained by transaction routing hub 104 as needed in various embodiments.

As an example of how a purchase order is processed, suppose buyer n 102 wants to make a purchase from supplier m 106. A purchase order or some purchase related information is sent to transaction routing hub 104 from buyer n 102. In some embodiments, a purchase order or other business process related information is sent to transaction routing hub 104 electronically. For example, in some embodiments, a user at buyer n 102 goes to a particular website or starts an application and enters purchase or other business process information. A variety of information may be provided, such as a supplier ID, a requested good/service, a quantity, a delivery date, a delivery location, a contact person or person associated with the buyer, etc.

Transaction routing hub 104 receives this purchase information and routes or otherwise sends the purchase order to supplier m 106 based on, for example, a supplier ID included in a purchase order. In some embodiments, supplier m 106 has specified to transaction routing hub 104 how that supplier would like to receive purchase orders. Some examples of how a supplier receives a purchase order from transaction routing hub 104 include via fax, email, Electronic Data Interchange (EDI), Commerce XML (CXML), etc. A variety of platforms, interfaces and/or devices can be included in supplier network 100. In various embodiments, various techniques for sending a purchase order or otherwise making a supplier aware of a purchase order are used. In some configurations, purchase orders are pushed to a supplier, for example by fax or email. In some configurations, a supplier can retrieve or otherwise pull a purchase order when so desired. For example, a user associated with a supplier m 106 may go to a particular website or run an application and check for any purchase orders.

There are a number of conveniences or advantages for a buyer that participates in supplier network 100. In some cases, a particular buyer is a large enterprise or corporation with thousands or tens of thousands of suppliers and/or a similar number of employees who can make purchases. Since all of the purchase or other business process information is stored electronically, processing and/or manipulation of purchase related information can be performed if so desired. In some embodiments, supplier network 100 is associated with a variety of reporting, auditing, and/or forecasting functions since data is stored electronically. Another advantage is the elimination of paper purchase orders on the buyer side. For example, the costs of materials associated with printer ink, paper, or stamps may be reduced or eliminated. In some cases, other resources such as manpower or paper records/repositories associated with purchase orders are similarly eliminated or conserved.

Supplier network 100 similarly offers some advantages for participating suppliers. In some cases, supplier network 100 enables a single communication channel via which purchase orders from many buyers are received. For example, without supplier network 100, one buyer may send their purchase orders via fax while another sends purchase orders via the post office. It may be inconvenient to check multiple channels of communication. In some cases, the format of purchase orders varies from buyer to buyer. One buyer may use one purchase order form with one set of fields and another uses another form. In some cases, a supplier who participates in supplier network 100 is a preferred or otherwise desirable supplier. For example, some buyers have business practices or policies in place to only (or when possible) make purchases from suppliers in supplier network 100. Not participating in supplier network 100 may mean a loss of business from buyers that have such policies or preferences.

However, before such benefits can be realized, supplier enablement (i.e., getting a supplier to join a supplier network) must be performed. In various embodiments, supplier enablement includes creation of a supplier account on transaction routing hub 104 (in some embodiments, this is not initiated by or performed by the supplier), populating or otherwise filling in the supplier account with information about the supplier, taking ownership of such an account, and/or committing or agreeing to any stipulated fees, terms, or conditions.

In many cases, supplier enablement is a difficult and/or time consuming task. Invite based supplier enablement and bulk ramp supplier enablement are two techniques for supplier enablement. In some systems, a buyer invites suppliers to join a supplier network, for example by having an employee of the buyer provide or enter information about its buyers via a website. A supplier receives an invitation and goes to a transaction routing hub or associated device and creates a supplier account, thus joining the supplier network.

For larger buyers, a bulk ramp technique may be more attractive where supplier enablement is outsourced and/or managed by a manager of a supply network (e.g., a company such as Ariba® that oversees a transaction routing hub and/or provides services to suppliers/buyers in a supplier network) or a third party. In some embodiments, a vendor master list is obtained from a buyer and is filtered or otherwise processed. In some cases, a vendor master list includes all approved vendors and information for those vendors. In many cases, a vendor master list includes duplicate, inaccurate, or out of date information and filtering or other processing is used to identify or remove such undesirable information. Supplier accounts are created on a transaction routing hub for the filtered or remaining suppliers and are populated or filled with information obtained from the vendor master list. These supplier accounts are in an unclaimed or unowned state (i.e., the supplier associated with a given account has not yet taken ownership or responsibility for the created supplier account) until a supplier accesses or communicates with a transaction routing hub to accept or take ownership of a supplier account.

Some existing techniques for supplier enablement are very time consuming. For example, in the case of bulk ramp, the amount of time spent trying to get suppliers to take ownership of their accounts once the accounts have been created can sometimes take months. A buyer may not want to start using a supplier network until all or a majority of suppliers have joined the supplier network and thus a buyer in some cases is blocked from using a supplier network for months.

Another undesirable aspect in the case of bulk ramp is the amount of man hours spent by the entity responsible for overseeing supplier enablement. One particular task in supplier enablement that consumes a significant amount of manpower is the filtering or processing of a vendor master list. This task often requires manual intervention or oversight to, for example, identify duplicate entries for the same supplier, identify suppliers that have gone out of business or who have merged with another supplier, etc.

There is also little synchronization between supplier enablement and current/future purchasing behavior on the part of a buyer. In some cases, supplier enablement is performed in batches and/or supplier enablement for one supplier may be performed earlier/later compared to another supplier depending upon which group they fall into. For example, although a given supplier may have been enabled (in some cases using resource expensive techniques such as calling suppliers to encourage them to join a supplier network once invited), that supplier may not necessarily receive a purchase order from a buyer in the near future. For example, a supplier may be a seasonal supplier and it is not the right time of year; a supplier may have been supplanted or replaced by a cheaper, faster, or otherwise more desirable supplier; or a supplier may service an area or region that the buyer no longer operates in. This results in an inefficient use of resources during supplier enablement.

In the example shown, supplier enablement is performed in an organic manner. In some embodiments, organic supplier enablement means that some or all of a supplier enablement process is performed in response to a business transaction associated with a purchase or other business process. In this example, the business transaction is a purchase order. In some embodiments, some other event or business transaction besides a purchase order is used to initiate a task or process associated with supplier enablement and/or to determine which supplier such a task or process is performed for. In some embodiments, some other business process besides a purchase is used. For example, some systems are configured to use a Request for Information (RFI) and/or a Request for Proposal (RFQ).

In this example, supplier 1 110 has not yet joined supplier network 100. Buyer 1 108 sends a purchase order to transaction routing hub 104. In some embodiments, a purchase order is submitted or sent using Extensible Markup Language (XML). Transaction routing hub 104 evaluates or processes the purchase order received from buyer 1 108 and determines that supplier 1 110 has not joined supplier network 100. For example, in some embodiments, a purchase order includes a supplier ID and a supplier ID is used in determining whether to create a new supplier account. A supplier account is created at transaction routing hub for supplier 1 110. In some embodiments, this account is populated or filled using information about supplier 1 110 obtained from buyer 1 108. In some embodiments, a buyer provides a master vendor list that includes a list of suppliers and information about those suppliers, such as company name; contact person; mailing address; telephone number; fax numbers; a bank routing number, account number, or other payment related information; etc.

A purchase order and an invitation are sent to supplier 1 110 from transaction routing hub 104. In various embodiments, an invitation includes a description of features or services associated with supplier network 100, the introduction of a manager of a supplier network (e.g., Ariba), instructions on how to join supplier network 100, terms or fees associated with joining supplier network 100, etc. If so desired, supplier 1 110 communicates with transaction routing hub 104 to take ownership of the supplier account created for it. For example, a user at supplier 1 110 may go to a website and login using an account name, account number and/or password included in an invitation.

A variety of networks and/or communication protocols can be used in supplier network 100 between a buyer and a transaction routing hub, as well as between a supplier and a transaction routing hub. Some example techniques or technologies include Internet/web based, wireless networks (such as mobile telephone networks, satellite networks, and wireless broadband networks), and/or wired networks (such as telephone connections, T1 connections, etc.). In some cases, different suppliers or buyers use different techniques to communicate with or access transaction routing hub 104.

In some embodiments, transaction routing hub 104 includes multiple devices or components that are physically separate or distinct from each other. In various embodiments, transaction routing hub 104 includes storage components, processing components, networking/communication components, etc. For example, in some configurations, a buyer or supplier is able to communicate with transaction routing hub 104 via an Internet or web interface and transaction routing hub 104 includes web servers or other devices. In some embodiments, transaction routing hub 104 includes storage components and purchase orders received by transaction routing hub 104 are stored. In some embodiments, purchase or other business process related information can be searched, manipulated, and/or processed and transaction routing hub 104 includes processing components for creating reports, searching, auditing, identifying open purchase orders, etc.

Although some examples discussed herein describe using a vendor master list, any database, store, or collection of supplier information can be used, such as information associated with Enterprise Resource Planning (ERP) and/or information managed using products from SAP, Oracle, or PeopleSoft.

Figure 2A:
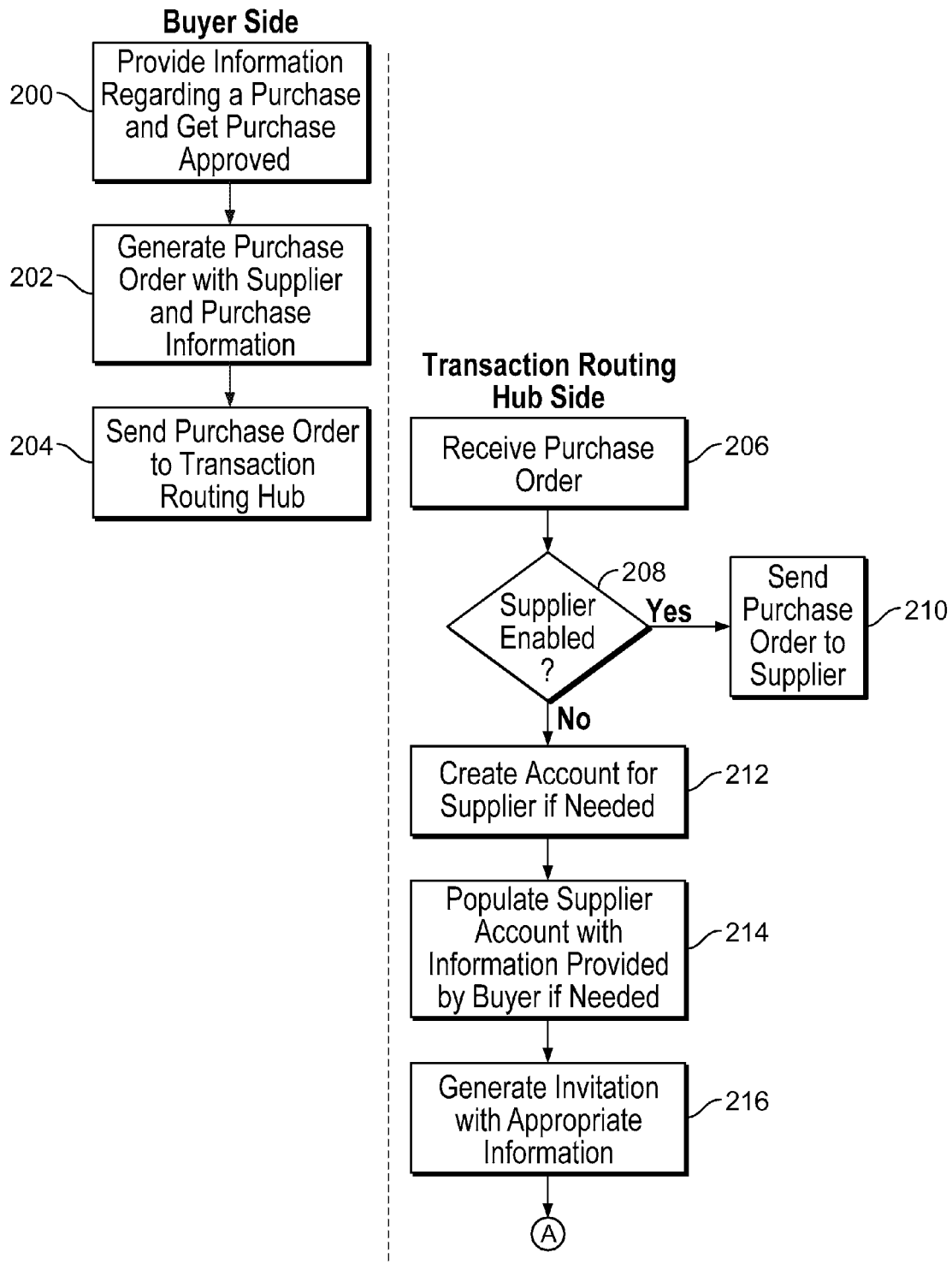
FIG. 2A is a flowchart illustrating an embodiment of a process for generating an invitation to be sent to a supplier for which there is a purchase order.

FIG. 2A is a flowchart illustrating an embodiment of a process for generating an invitation to be sent to a supplier for which there is a purchase order. In the example shown, supplier enablement is not started or otherwise initiated for a supplier unless there is a purchase order for that supplier. For example, a transaction routing hub will not create a supplier account for a supplier unless the transaction routing hub has received a purchase order for that supplier. In some embodiments, some other business transaction or business process besides a purchase order is used to initiate or perform organic supplier enablement.

At 200, information regarding a purchase is provided and a purchase is approved. For example, some companies require managers or certain designated people to approve of a purchase before a purchase order is sent out. At 202, a purchase order is generated with supplier and purchase information. In some embodiments, a user at a buyer goes to a website or runs an application and provides this information. In some embodiments, a supplier is identified using a unique supplier ID. At 204, a purchase order is sent to a transaction routing hub. Any appropriate network or communication technique can be used. For example, in some embodiments a push architecture is used and in other embodiments a pull architecture is used.

At 206, a purchase order is received. In some embodiments, a purchase order is described or communicated using XML. It is determined at 208 whether a supplier is enabled. For example, in some embodiments, a purchase order received at 206 includes a supplier ID. In some embodiments, a supplier is not enabled until that supplier takes ownership of a supplier account created for it. In some embodiments, a supplier performs some other task in addition to or as an alternative to taking ownership of a supplier account, such as agreeing to some payment or contract.

If a supplier is enabled, a purchase order is sent to a supplier at 210. In some embodiments, the supplier account for that supplier is retrieved and information included in the account is used to properly route the purchase order. For example, in some embodiments, a supplier account includes a preferred communication channel (via fax, email, etc.) and the routing or delivery information (e.g., a fax number, an email address, etc.).

Otherwise, if a supplier is not enabled, at 212, an account is created for a supplier if needed. At 214, a supplier account is populated with information provided by a buyer if needed. In some cases, a supplier account has been created and/or populated with information but a supplier has not yet taken ownership of the account; thus in some cases it is not necessary to create and populate a supplier account at 212 and 214 again. In some embodiments, a buyer provides a transaction routing hub with a vendor master list or some other collection of information about one or more suppliers and this information is used to populate an account with information at 214.

An invitation is generated with appropriate information at 216. In some embodiments, this is customizable to varying degrees and/or is based on various factors. For example, in some embodiments, one buyer would like certain material or information to be included in invitations and another buyer would like a different message (e.g., the name of the buyer, a buyer's policies or preferences regarding suppliers that join or do not join a supplier network, etc.). In some embodiments, invitations generated for large suppliers are different from invitations generated for small suppliers (e.g., an invitation includes different prices or terms/conditions for joining a supplier network based on the size of a supplier). These are some examples of generating an invitation at 216. In some embodiments, an invitation has already been sent to a supplier and a previously sent invitation is reused or modified to some degree.

Figure 2B:
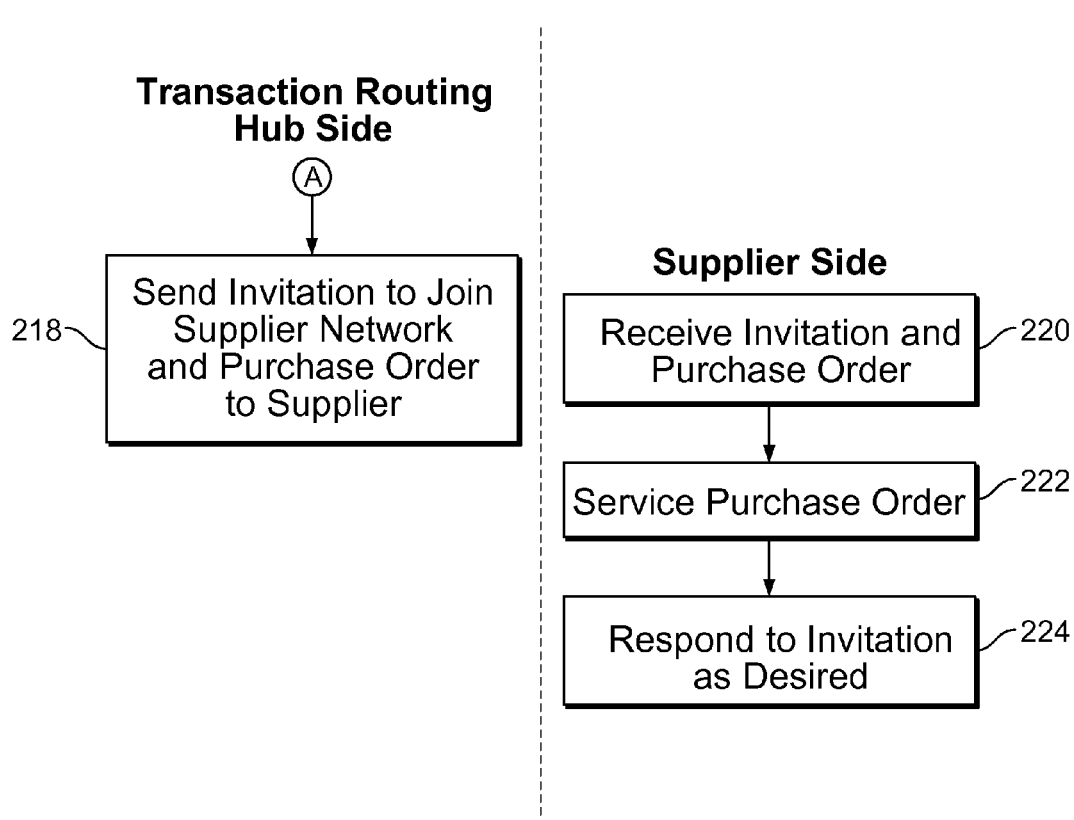
FIG. 2B is a flowchart illustrating an embodiment of a process for sending a purchase order and invitation to a supplier.

FIG. 2B is a flowchart illustrating an embodiment of a process for sending a purchase order and invitation to a supplier. In the example shown, the process of FIG. 2A is continued in this figure. At 218, an invitation to join a supplier network and a purchase order are sent to a supplier. In some embodiments, a vendor master list or other collection of information provided by a buyer is used. In some embodiments, an invitation and a purchase order are sent via multiple communication channels to ensure that an invitation and purchase order are received. For example, in some cases they are sent by email as well as fax.

At 220, an invitation and a purchase order are received. At 222, a purchase order is serviced. For example, a requested good or service is delivered or supplied according to the terms of the purchase order. In some embodiments, a supplier sends an invoice to a buyer requesting payment for the goods or services provided. At 224, an invitation is responded to as desired. In some cases, a supplier ignores an invitation. In some cases, a supplier takes ownership of a supplier account created for it on a transaction routing hub, agrees to pay a fee, agrees to certain terms or conditions, and/or performs some other action to complete supplier enablement.

In the examples of FIGS. 1, 2A, and 2B, a supplier is not blocked from accessing a purchase order sent with an invitation to join a supplier network. That is, a supplier in the examples shown above is able to retrieve or obtain a purchase order without, for example, having to take ownership of a created supplier account. Alternatively, in some embodiments, a supplier that receives an invitation and a purchase order is required to take ownership of a supplier account or otherwise complete supplier enablement before being able to access a purchase order. In some embodiments, suppliers from which relatively low quantities of items are purchased or to which relatively low amounts of money are due do not have to join a supplier network in order to access or retrieve a purchase order. In some embodiments, suppliers that surpass some threshold are blocked from retrieving a purchase order until they take ownership for a supplier account or otherwise complete supplier enablement. The following figure illustrates an example of one such embodiment.

Figure 3:
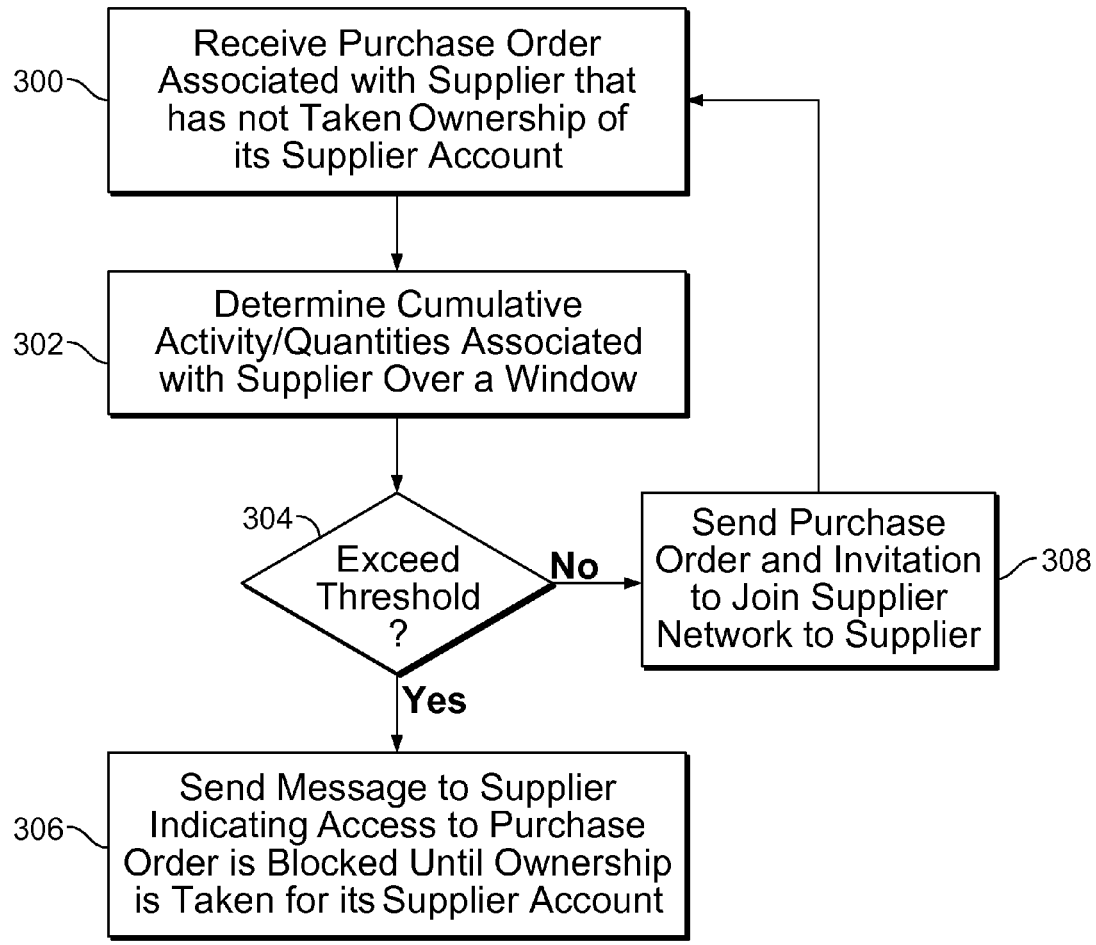
FIG. 3 is a flowchart illustrating an embodiment of a process for blocking a non-enabled supplier from accessing a purchase order in the event a threshold is exceeded.

FIG. 3 is a flowchart illustrating an embodiment of a process for blocking a non-enabled supplier from accessing a purchase order in the event a threshold is exceeded. In the example shown, a supplier that is under some threshold is permitted to retrieve or obtain purchase orders without being required to take ownership of a supplier account. Alternatively, in some embodiments, such a decision and/or blocking process is not performed. In some embodiments, the example process is performed at a transaction routing hub, such as transaction routing hub 104.

At 300, a purchase order associated with a supplier that has not taken ownership of its supplier account is received. In some embodiments, there is some other task or event to be completed associated with supplier enablement in addition to or as an alternative to taking ownership of a supplier account. For example, in some embodiments, a supplier has to agree to a contract or agree to pay a fee.

Cumulative activity/quantities associated with a supplier are determined over a window at 302. In some embodiments, a transaction routing hub includes storage components and previous purchase orders are retrieved from storage. In some embodiments, all purchase orders are used regardless of which buyer a purchase order originates from. In some embodiments, only purchase orders from a current buyer (e.g., that sent a purchase order received at 300) are used.

In some embodiments, a cumulative quantity is determined for an individual product (e.g., 100 pens were purchased) or for all products (e.g., 5,000 office supplies were purchased). In some embodiments, an amount of money is determined, either from a particular buyer or from all buyers in a supplier network. In some embodiments, the number of buyers that send at least one purchase order to the supplier is determined. In some embodiments, the number of purchase orders received by the supplier is determined (e.g., from a particular buyer or from all buyers).

In various embodiments, various windows of time are used. Some examples of windows of time include the previous twelve months, the last complete fiscal quarter, the entire period of time since a related supplier account was created, etc.

It is determined at 304 whether a threshold is exceeded. In some embodiments, operations such as AND or OR are used. For example, in some embodiments, a threshold is not determined to be exceeded at 304 unless the cumulative number of items purchased exceeds a first threshold and a cumulative amount of money exceeds a second threshold. If a threshold is not exceeded, at 308 a purchase order and an invitation to join a supplier network are sent to a supplier. That is, access to a purchase order is not blocked so long as the threshold is not exceeded in the example shown. A purchase order is then received at 300.

Otherwise, if a threshold is exceeded, a message is sent to a supplier indicating that access to a purchase order is blocked until ownership is taken for its supplier account at 306. That is, a supplier is not able to receive or obtain the purchase order until the supplier takes ownership of the supplier account and thus completes supplier enablement. In some embodiments, some information about the purchase order being blocked is included in such an indication. For example, the name of the buyer, the quantity of the desired good or service, and/or some other information may be included in a message. This may further encourage or induce a supplier to take ownership of a supplier account. In some embodiments, some other action or task is required besides taking ownership of an account.

In some embodiments, a buyer is involved in the process to some degree. For example, some supplier networks are configured to send a message to a buyer, indicating that the purchase order has been blocked. This may, for example, make a buyer aware of possible delays in the purchase. In some embodiments, a purchase is critical and a buyer is able to override or otherwise prevent a purchase order from being blocked.

In some embodiments, some other decision making process is used in deciding whether to restrict access to a purchase order or other business process or transaction. In some embodiments, a threshold is used but a cumulative activity/value over time is not used. For example, some decision making processes use information from a single purchase order or other business process transaction. If, for example, a quantity of goods or an amount of money associated with a single purchase order or other transaction exceeds a threshold then access is restricted in some embodiments. In some embodiments, a cumulative quantity over time is used but a threshold is not. For example, some decision making processes determine cumulative activity/values over a period of time for suppliers that have not yet joined a supplier network. Suppliers with the highest activities or values in some embodiments are restricted from accessing a purchase order or other information to encourage them to complete supplier enablement.

As described above, in some embodiments, some other business transaction besides a purchase order is used in organic supplier enablement. The following figure illustrates an example where an invoice is used to perform some tasks or processes associated with supplier enablement.

Figure 4:
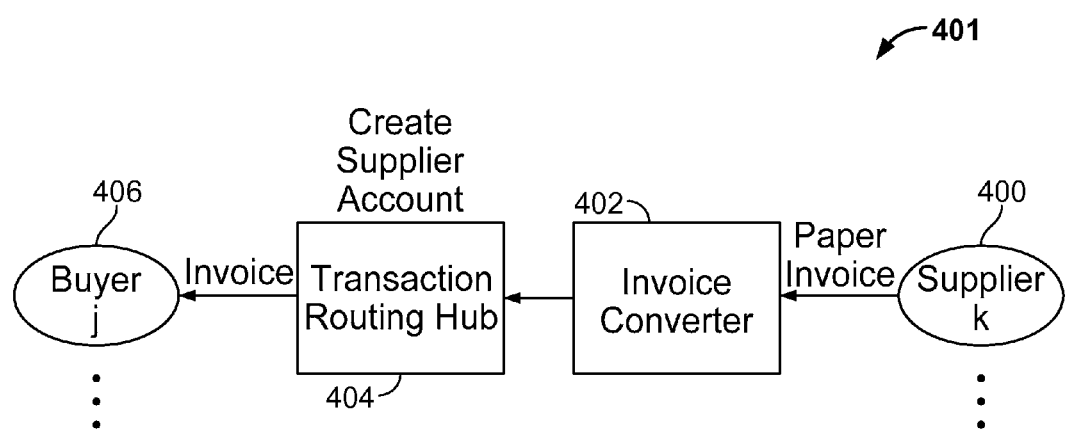
FIG. 4 is a system diagram illustrating an embodiment of a supplier network in which a supplier is organically enabled based on an invoice.

FIG. 4 is a system diagram illustrating an embodiment of a supplier network in which a supplier is organically enabled based on an invoice. In the example shown, a purchase is made without issuing or otherwise sending a purchase order to a transaction routing hub. This can occur in some cases. For example, if a purchase is a small purchase, some companies permit their employees to make a purchase without using a supplier network. If, for example, supplier k 400 is a pizzeria, an employee can call in an order of pizza without sending a purchase order to transaction routing hub 404. In the example shown, supplier network 401 includes invoice converter 402 to handle paper invoices so that buyer j 406 operates or otherwise functions in a completely paperless manner with respect to purchases.

Supplier k 400 sends a paper invoice to invoice converter 402. For example, a bill for a pizza order is sent to a post office box or some other mailing address to which supplier k 400 is directed to send paper invoices. In some embodiments, a scanner or multifunction printer capable of generating a Portable Document Format (PDF) file or other digital representation of a scanned piece of paper is used. In some embodiments, Optical Character Recognition (OCR) is used to convert writing or characters in a printed document into data or objects that can be stored, manipulated, and/or operated on in digital format (e.g., represented in ASCII format). In some embodiments, some string matching or other process is used to identify or extract certain pieces of information. For example, a supplier's name (e.g., Mario's Pizzeria), an amount due (e.g., $20), and/or the date the goods/services were delivered on (e.g., Aug. 1, 2006) are extracted from an invoice in some embodiments. If needed, exception or error handling is used to deal with some converted invoices; this may include a person manually reviewing or checking an invoice if an error or exception is flagged. In some embodiments, a person manually extracts information from an invoice.

Invoice converter 402 includes one or more components or devices necessary to support the features and/or functionality of a particular embodiment. In some embodiments, a certain function or interface with transaction routing hub 404 is supported and components or devices to support this are included in invoice converter 402. Although in this figure only one buyer and one supplier are shown, in some embodiments, an invoice converter provides services or otherwise supports multiple suppliers and/or multiple buyers. For example, in some configurations, all suppliers for a given buyer are directed to send their paper invoices to a particular post office box or mailing address. In some configurations, multiple buyers have their paper invoices converted or otherwise processed by the same invoice converter. Providing services for a plurality of suppliers and/or a plurality of buyers in some cases keeps costs down.

Converted and/or otherwise extracted information is passed to transaction routing hub 404. In some embodiments, invoice converter 402 is operated or managed by a third party (e.g., a different entity than one that operates or manages transaction routing hub 404). In some cases, a company that specializes in digital conversion and/or optical recognition techniques manages or operates invoice converter 402. In some embodiments, invoice converter 402 is located remotely from transaction routing hub 404 and they are coupled via a network. Any appropriate communication or networking technique can be used to connect transaction routing hub 404 and invoice converter 402.

Using information received from invoice converter 402, it is determined at transaction routing hub 404 whether a supplier account exists for supplier k 400. If not, a new supplier account is created. In some embodiments, a supplier account is populated or filled with information from a vendor master list or other collection of information obtained from buyer j 406. An invoice is generated and sent to buyer j 406. In this example, the invoice is delivered in electronic format.

In this example, supplier enablement (e.g., including creation of a supplier account) is performed organically in response to an invoice. In various embodiments, organic supplier enablement is performed in response to purchase orders, invoices, or some combination of the two, so that supplier enablement occurs naturally as a result of a business transaction.

In this example, a supplier is not immediately invited to take ownership of the supplier account created on transaction routing hub 404. For example, in some configurations, supplier k 400 may continue to send paper invoices to invoice converter 402 and the supplier account created on transaction routing hub 404 is used. In some embodiments, a supplier is invited to take ownership of a supplier account if one or more conditions are met. For example, in some embodiments a supplier is not invited to take ownership of a supplier account until some threshold is surpassed. For example, for small suppliers it may be acceptable to use invoice converter 402 to convert or process paper invoices. In various embodiments, a threshold (if used) is based on a number of invoices, an amount of money, a quantity of goods/services purchased, a number of buyers for a given supplier, etc. In some embodiments, a determination uses an operation such as AND or OR. In some embodiments, a value or quantity that is used in a determination is measured or is cumulative over a certain period of time. Alternatively, in other embodiments, a supplier is immediately or always invited to take ownership of a supplier account once it is created on a transaction routing hub.

In one example, a buyer pays for an invoice conversion service; as the number of invoices increases using this payment structure, it may become more attractive (from the point of view of the buyer) to have a supplier take ownership of its supplier account. For example, supplier k 400 could enter or provide invoice information directly to transaction routing hub 404, bypassing or otherwise avoiding the need to use invoice converter 402 since paper invoices would no longer be submitted by supplier k 400 after taking ownership of a supplier account.

Figure 5:
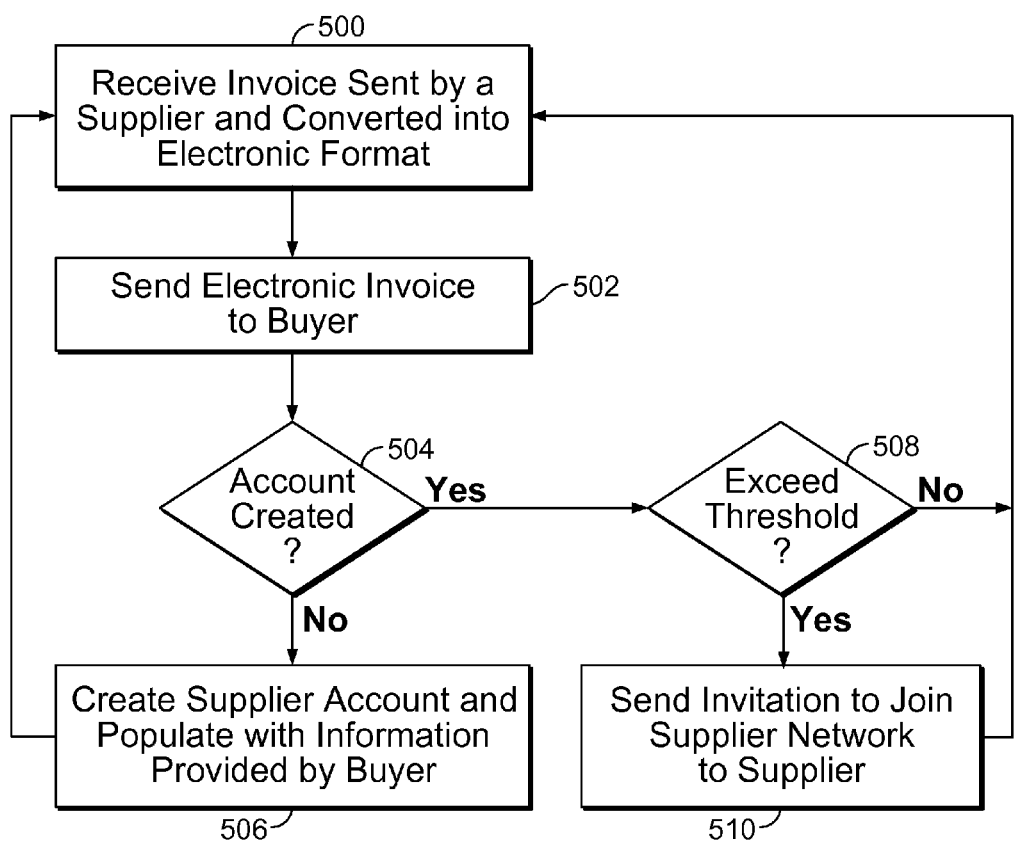
FIG. 5 is a flowchart illustrating an embodiment of a process for performing organic supplier enablement based on an invoice.

FIG. 5 is a flowchart illustrating an embodiment of a process for performing organic supplier enablement based on an invoice. In the example shown, a supplier sends a paper invoice that is converted into electronic format. In some cases, there is no purchase order that corresponds to the purchase (e.g., if a purchase is a small purchase). In some embodiments, the example process is performed by a transaction routing hub and/or an invoice converter.

At 500, an invoice sent by a supplier is received and converted into electronic format. For example, scanning and/or OCR technology can be used. At 502, an electronic invoice is sent to a buyer. In various embodiments, an invoice is sent to a buyer using a variety of techniques (e.g., pushing/pulling) or communication channels.

At 504, it is determined whether an account has been created. For example, an invoice received at 502 may include a supplier ID and a determination is performed at 504 using the supplier ID. If an account has not been created, at 506, a supplier account is created and populated with information provided by a buyer. In some embodiments, a vendor master list or some other collection of information provided by a buyer about one or more suppliers is used. In some embodiments, information used to populate an account is provided by the supplier associated with an invoice. For example, if the supplier is new, the name and contact information included in the invoice may be used to populate the supplier account. In some embodiments, some combination of information from a buyer as well as a supplier is used.

If an account has been created, it is determined at 508 whether a threshold has been exceeded. In this example, a supplier is not sent an invitation until a threshold is exceeded, such as the number of invoices, number of buyers serviced by a particular supplier, a quantity of purchased goods or an amount of money owed, etc. If a threshold is exceeded, an invitation is sent to a supplier to join a supplier network at 510. In some embodiments, invitations are configurable or customizable (e.g., based on buyer and/or supplier). In some embodiments, an invitation includes identification of one or more buyers that are part of a supplier network (e.g., to encourage a supplier to join a supplier network), advantages/services associated with joining, rules or policies certain buyers have regarding supplier enablement (e.g., a certain buyer requires relatively large suppliers to join a supplier network and the supplier receiving this message falls within that group and/or a certain buyer has purchasing policies that favor suppliers that have joined a supplier network), etc. If a threshold is not exceeded, the next invoice is received and converted at 500.

In some embodiments, a process for organic supplier enablement based on an invoice varies from the example described above. For example, in this example it is assumed that an enabled supplier (e.g., has taken ownership of its supplier account) will not send a paper invoice. In some embodiments, the example process is modified to handle such a situation, for example, if an enabled supplier is too lazy or forgets to provide invoice information directly to a transaction routing hub using its supplier account.

One issue associated with supplier enablement is duplicate supplier accounts. Some existing supplier enablement techniques require a significant amount of resources to be spent avoiding creation of duplicate supplier accounts and/or identifying duplicate supplier accounts after creation. The following figure illustrates an example of how duplicate accounts or information are handled in some embodiments of organic supplier enablement systems.

Figure 6:
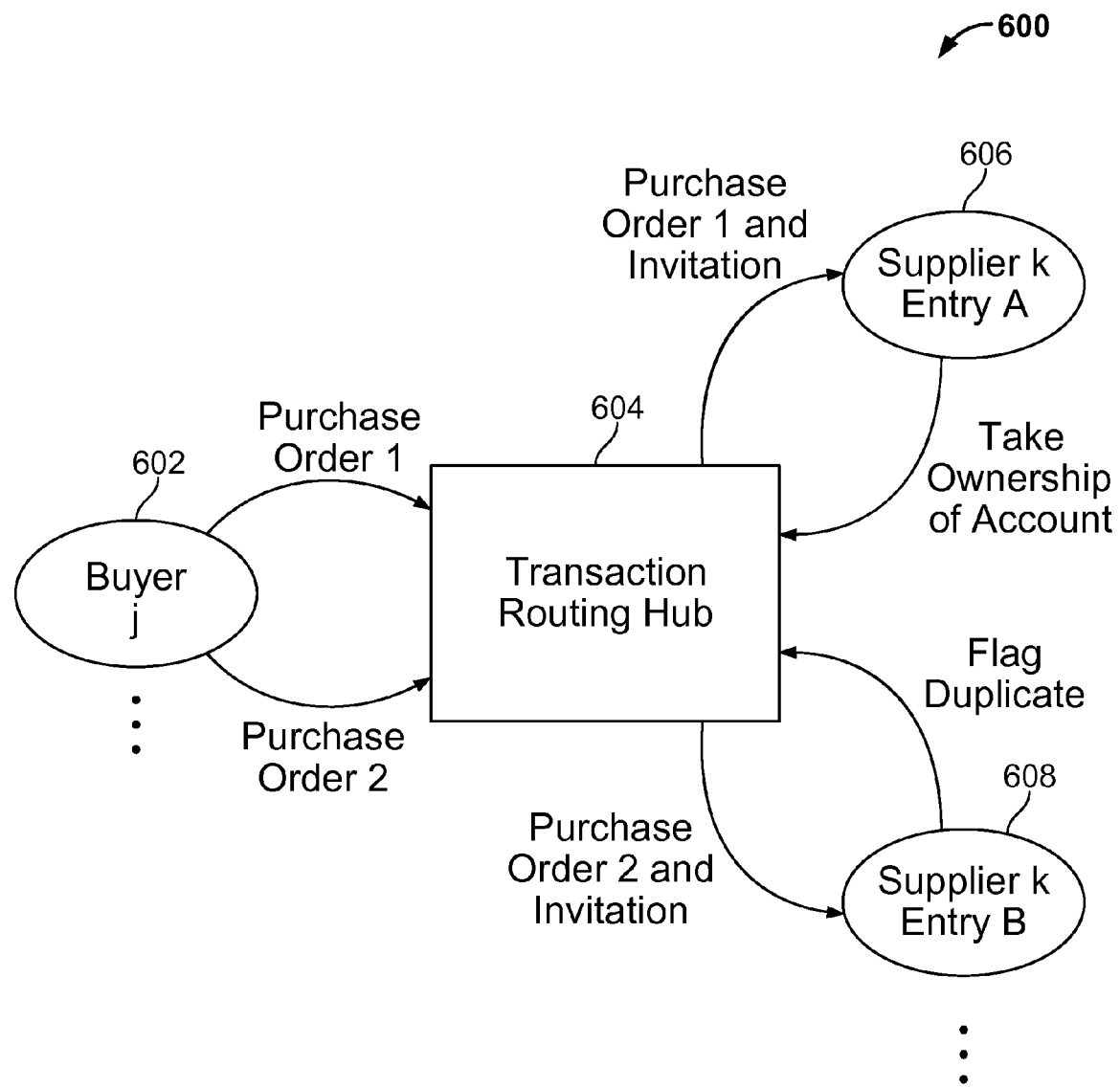
FIG. 6 is a diagram illustrating an embodiment in which identification and/or resolution of duplicate supplier accounts is performed by suppliers.

FIG. 6 is a diagram illustrating an embodiment in which identification and/or resolution of duplicate supplier accounts is performed by suppliers. In the example shown, supplier network 600 performs organic supplier enablement based on purchase orders. In some embodiments, the example techniques associated with duplication described herein are based on some other business transaction besides purchase orders. Although this figure illustrates a single buyer and two suppliers, it is to be understood that supplier network 600 is capable of supporting any number of buyers and/or suppliers.

In the example shown, identification and/or resolution of duplicate supplier accounts is performed by suppliers 606 and 608 as opposed to buyer j 602 or an entity that manages supplier enablement. In the example shown, supplier k has multiple entries associated with it, for example, in the vendor master list of buyer j 602. Purchase order 1 is sent from buyer j 602 to transaction routing hub 604. A supplier account is created based on purchase order 1 at transaction routing hub 604. Purchase order 1 and an invitation are sent to supplier k, entry A 606. Some user associated with supplier k, entry A 606 then accesses or communicates with transaction routing hub 604 to take ownership of the supplier account. For example, an account manager working for supplier k logs on to a website associated with transaction routing hub 604 and via the web interface takes ownership.

A second purchase order is sent from buyer j 602 to transaction routing hub 604. This second purchase order is associated with an entry B of supplier k from a vendor master list or other collection of suppliers. For example, the first and second purchase order may have different supplier IDs. Since the second purchase order is associated with a different entry or supplier ID than the first purchase order, a second supplier account is created at transaction routing hub and populated with information. In some cases, the information included in a vendor master list for a first entry and a second entry are completely identical. For example, the mailing address, contact person, fax number, telephone number, and such may be the same for both entries. In some cases, some of the information does not overlap. For example, some suppliers are very large companies, and entries A and B may be associated with different divisions, different offices/locations, different contact people, etc.

A second purchase order and invitation are sent to supplier k, entry B 608 from transaction routing hub 604. A user associated with supplier k, entry B 608 accesses or communicates with transaction routing hub 604 and flags the duplicate. In this example, once a duplicate supplier account is identified, the older supplier account (i.e., that associated with supplier k, entry A 606) is the authority in determining how the duplication should be handled. For example, supplier k, entry A 606 is notified that a duplication has been flagged. Supplier k, entry A 606 can then decide to merge the supplier accounts or to maintain separate accounts.

In this example, the merging of two supplier accounts is kept transparent to buyer k 602. For example, mapping or routing information stored at transaction routing hub 604 is updated or modified as appropriate. This, for example, enables a buyer to continue using two different supplier IDs but purchase orders or other business transactions are mapped to the same supplier account. In some embodiments, the buyer is also notified of the duplication.

Handling duplicates in the described manner offers some advantages over other techniques for supplier enablement. For example, some bulk ramp techniques require many man hours on the part of an entity that oversees supplier enablement to filter through a master vendor list, identify duplicates, and decide which one to use. Another advantage in having a supplier be responsible for duplication related tasks is that in many cases a supplier is a better authority in resolving duplications. In some cases, duplicate supplier accounts are desired, for example, because a supplier has different divisions or business units that operate as independent entities. For accounting purposes or other business reasons, a supplier may desire multiple supplier accounts. An employee associated with an entity that oversees supplier enablement may not be able to make the best decision about when it is appropriate to have duplicate supplier accounts.

In some embodiments, techniques are used to assist a supplier in identifying duplicates and/or determining how to properly handle such duplicates. For example, in some embodiments, potential or possible duplicates are identified to supplier k, entry B 608 in an invitation and/or when accessing or communicating with transaction routing hub 604. Some examples are described in further detail below.

Figure 7:
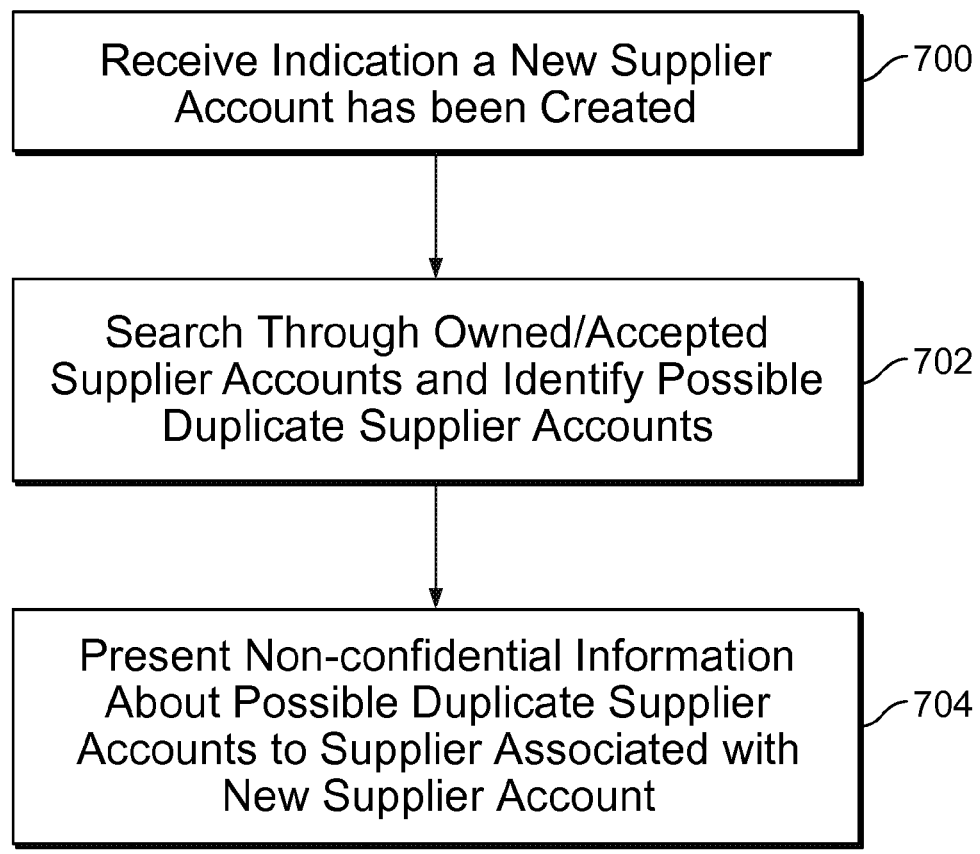
FIG. 7 is a flowchart illustrating an embodiment of a process for providing a supplier with information to assist in identifying duplicate supplier accounts.

FIG. 7 is a flowchart illustrating an embodiment of a process for providing a supplier with information to assist in identifying duplicate supplier accounts. In the example shown, the process is performed by a transaction routing hub. At 700, an indication is received that a new supplier account has been created. At 702, owned/accepted supplier accounts are searched through and possible duplicate supplier accounts are identified. In this example, only those supplier accounts for which a supplier has taken ownership are searched. Since in this example an older supplier is responsible for resolving a flagged duplication, only supplier accounts for which ownership has been taken or accepted are searched in this embodiment. In some embodiments, a different set or collection of supplier information is searched.

At 704, non-confidential information about the possible duplicate supplier accounts is presented to a supplier associated with new supplier account. In some applications it is desirable to keep some information about suppliers confidential or private. In some embodiments, information such as a contact person or a contact person's contact information (e.g., telephone number and/or email) are not presented at 704. Some systems are configured to only present the company name (e.g., Mario's Pizzeria) and the city/state (e.g., Sunnyvale, Calif.) for the possible duplicate supplier account(s). In some embodiments, information about possible duplicate supplier accounts is included in an invitation that is sent to a supplier. In some embodiments, such information is presented when a supplier accesses a transaction routing hub or other interface to take ownership of a supplier account.

In some embodiments, the process described herein is modified or supplemented with other techniques. For example, in some embodiments, a general message about duplicates is presented to a supplier. Some invitations that are sent to suppliers include a message to notify the transaction routing hub or other entity if the supplier has already joined a supplier network and/or has received an invitation with a different supplier ID.

In some embodiments, a transaction routing hub or other entity receives a selection of zero or more identified duplicate supplier accounts from a supplier. In some embodiments, a transaction routing hub is responsible for contacting the suppliers that are flagged or selected as being duplicates, rather than having one supplier directly contact another supplier. The following figure illustrates an embodiment of such a process.

Figure 8:
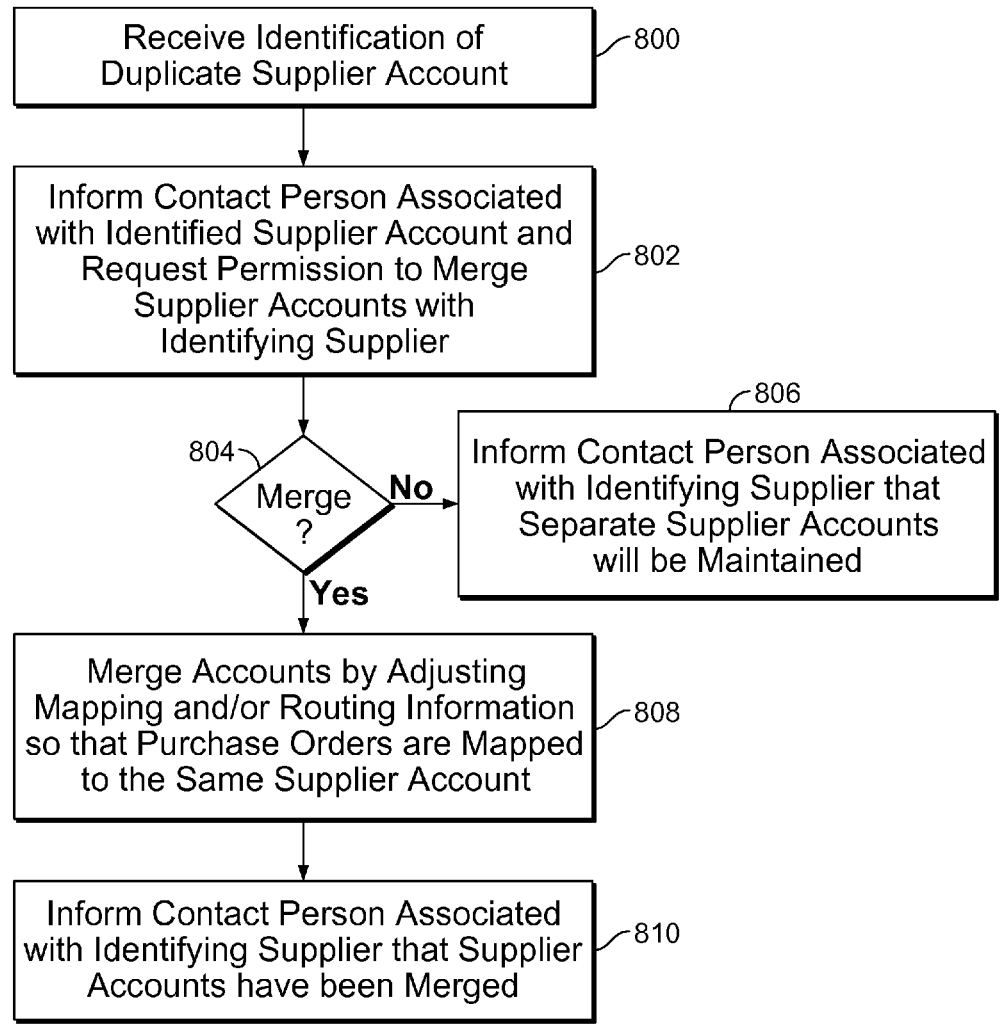
FIG. 8 is a flowchart illustrating an embodiment of a process for resolving duplicate supplier accounts that are identified or otherwise flagged.

FIG. 8 is a flowchart illustrating an embodiment of a process for resolving duplicate supplier accounts that are identified or otherwise flagged. In the example shown, duplicate supplier accounts are identified by a supplier for which a new supplier account has been created, and a contact person associated with an identified supplier account is responsible for resolving the identified duplication. In some embodiments, some other assignment of responsibilities is used.

At 800, identification of a duplicate supplier account is received. In some cases, more than one supplier account is identified and the example process is repeated or modified as appropriate. Referring to the example of FIG. 6, an indication in some embodiments is received from supplier k, entry B 608. At 802, a contact person associated with an identified supplier account is informed and permission to merge supplier accounts with an identifying supplier is requested. Referring to the example of FIG. 6, a contact person associated with supplier k, entry A 606 is informed in some embodiments.

At 804 it is determined whether to merge. For example, a contact person may review or access information associated with the other supplier account and decide whether or not to merge accounts. In some cases, it is decided to not merge accounts. In some cases, two different suppliers have the same name but operate in different geographical regions. In some cases, supplier accounts are associated with different business units or divisions of the same company and separate supplier accounts are desired.

If it is decided a merge will not be performed, at 806, a contact person associated with an identifying supplier is informed that separate supplier accounts will be maintained. For example, in FIG. 6, supplier k, entry B 608 in some embodiments is notified that separate supplier accounts will be maintained.

Otherwise, accounts are merged by adjusting mapping and/or routing information so that purchase orders are mapped to the same supplier account at 808. For example, in some embodiments, duplicate supplier accounts were created because two different supplier IDs were used in purchase orders. In some embodiments, mapping or routing information is stored in a transaction routing hub and this stored information is updated or modified as appropriate. In some embodiments, merging is transparent to a buyer and different supplier IDs can still be used by a buyer. In some embodiments, three or more supplier IDs are mapped to the same supplier account.

At 810, a contact person associated with an identifying supplier is informed that supplier accounts have been merged. For example, in FIG. 6, supplier k, entry B 608 in some embodiments is notified that the duplicate supplier accounts will be merged.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
  receiving a commercial transaction associated with a business process between a particular supplier and a buyer;
  in response to receiving the commercial transaction, determining, using a processor, whether the particular supplier is a member of a supplier network; and
  in response to a determination that the particular supplier is a member of the supplier network, providing an indication of the commercial transaction to at least one of the buyer and the particular supplier;
  in response to a determination that the particular supplier is not a member of the supplier network, initiating a supplier enablement action, wherein the supplier enablement action is associated with enabling the particular supplier to join the supplier network.

2. A method as recited in claim 1, wherein the business process includes a purchase.

3. A method as recited in claim 1, wherein the commercial transaction includes an invoice.

4. A method as recited in claim 1 further comprising determining whether to restrict access by the particular supplier to information associated with the business process based at least in part on a cumulative quantity over a window of time.

5. A method as recited in claim 1 further comprising determining whether to restrict access by the particular supplier to information associated with the business process based at least in part on a threshold.

6. A method as recited in claim 1, wherein the supplier enablement action includes inviting the particular supplier to join the supplier network.

7. A system, comprising:
an interface configured to receive a commercial transaction associated with a business process between a particular supplier and a buyer; and
a processor configured to:
in response to receiving the commercial transaction, determine whether the particular supplier is a member of a supplier network; and
in response to a determination that the particular supplier is a member of the supplier network, providing an indication of the commercial transaction to at least one of the buyer and the particular supplier;
in response to a determination that the particular supplier is not a member of the supplier network, initiating a supplier enablement action, wherein the supplier enablement action is associated with enabling the particular supplier to join the supplier network.

8. A system as recited in claim 7, wherein the supplier enablement action includes inviting the particular supplier to join the supplier network, including sending one or more instructions associated with joining the supplier network to the particular supplier.

9. A system as recited in claim 7, wherein the supplier enablement action includes inviting the particular supplier to join the supplier network, including sending a fee associated with joining the supplier network to the particular supplier.

10. A system as recited in claim 7, wherein the supplier enablement action includes creating for the particular supplier a supplier account associated with the supplier network.

11. A system as recited in claim 7, wherein the supplier enablement action includes:
creating for the particular supplier a supplier account associated with the supplier network; and
populating the supplier account using data from the buyer.

12. A system as recited in claim 7, wherein the interface is further configured to receive an indication from the particular supplier associated with taking ownership of a supplier account associated with the supplier network.

13. A system as recited in claim 7 further comprising a supplier interface configured to:
present to the particular supplier one or more possible duplicate supplier accounts; and
receive from the particular supplier zero or more selections from the possible duplicate supplier account(s).

14. A system as recited in claim 7, wherein the processor is further configured to:
search through a group of one or more supplier accounts for one or more possible duplicate supplier accounts to be presented, wherein for each supplier account in the group a corresponding supplier has taken ownership for that supplier account;
present to the particular supplier the possible duplicate supplier account(s); and
receive from the particular supplier zero or more selections from the possible duplicate supplier account(s).

15. A system as recited in claim 7, wherein the processor is further configured to:
present to the particular supplier one or more possible duplicate supplier accounts, wherein confidential information associated with the possible duplicate supplier account(s) is not made available to the particular supplier; and
receive from the particular supplier zero or more selections from the possible duplicate supplier account(s).

16. A computer program product embodied in a non-transitory computer readable storage medium and comprising computer instructions configured to cause performance of the steps comprising:
receiving a commercial transaction associated with a business process between a particular supplier and a buyer;
in response to receiving the commercial transaction, determining whether the particular supplier is a member of a supplier network; and
in response to a determination that the particular supplier is a member of the supplier network, providing an indication of the commercial transaction to at least one of the buyer and the particular supplier;
in response to a determination that the particular supplier is not a member of the supplier network, initiating a supplier enablement action, wherein the supplier enablement action is associated with enabling the particular supplier to join the supplier network.

* * * * *